(12) United States Patent
Gabbianelli et al.

(10) Patent No.: US 6,346,684 B1
(45) Date of Patent: Feb. 12, 2002

(54) WELDING MATERIAL ASSEMBLY AND METHOD

(75) Inventors: Gianfranco Gabbianelli, Troy; Ralph Miller, Sterling Heights, both of MI (US)

(73) Assignee: Cosma International Inc., Concord (CA)

(*) Notice: Subject to any disclaimer, the term of this patent is extended or adjusted under 35 U.S.C. 154(b) by 0 days.

(21) Appl. No.: 09/518,646

(22) Filed: Mar. 3, 2000

Related U.S. Application Data

(63) Continuation-in-part of application No. 09/173,554, filed on Oct. 16, 1998, now Pat. No. 6,092,865.
(60) Provisional application No. 60/062,204, filed on Oct. 16, 1997.

(51) Int. Cl.⁷ .......................... B23K 11/00; B23K 9/02; B21D 53/88
(52) U.S. Cl. ................ 219/117.1; 219/60 A; 219/60.2; 29/897.2; 296/29
(58) Field of Search ............................ 219/117.1, 60 A, 219/60.2; 156/233; 29/421.1, 897.2; 296/29

(56) References Cited

U.S. PATENT DOCUMENTS

| | | | |
|---|---|---|---|
| 1,581,931 A | 4/1926 | Lamplugh | |
| 1,846,567 A | 2/1932 | Murray, Jr. | |
| 2,269,451 A | 1/1942 | Ford | 296/28 |
| 2,389,907 A | 11/1945 | Helmuth | 296/28 |
| 2,668,722 A | 2/1954 | Muller | 280/106 |

(List continued on next page.)

FOREIGN PATENT DOCUMENTS

| | | |
|---|---|---|
| DE | 867059 | 1/1953 |
| DE | 4122862 | 1/1993 |
| DE | 4122972 A1 | 7/1993 |
| EP | 0570150 A1 | 11/1993 |
| FR | 694774 | 12/1930 |
| WO | WO97/00595 | 1/1997 |

OTHER PUBLICATIONS

US Patent Application Publication US 2001/0000119 A1, Hydroformed Space Frame and Joints Therefor, Jaekel et al., Apr. 5, 2001.*
US Patent Application Publication US 2001/0019039 A!, Welding Assembly with Nestable Cuductive Ends, GAbbianelli et al., Sep. 6, 2001.*
"Lighter Car Body in Aluminum wqith Hydroforming Technology R&D Results," Hanicke et al., IBEC 96, Detroit, Oct. 1–3, Volvo Car Corporation, 1996.
International Application No. PCTR/CA 98/00962, PCT Search Report, mailed Jan. 17, 1999, Magna International Inc.

*Primary Examiner*—Tom Dunn
*Assistant Examiner*—L. Edmondson
(74) *Attorney, Agent, or Firm*—Pillsbury Winthrop LLP

(57) ABSTRACT

A welding material assembly is constructed and arranged to position a welding material in electrically conductive relation between exterior surface portions of first and second weldable members at a location where the first and second weldable members are to be joined. The welding material assembly includes at least one welding material member mounted on a flexible carrier sheet in a predetermined arrangement, each welding material member being constructed of an electrically conductive metallic welding material capable of melting when heated by application of an electrical current and each carrier sheet being constructed of a material that is electrically nonconductive. Each welding material member is mounted on the sheet such that when the sheet is placed between the exterior surfaces of said first and second weldable members to be welded each said welding material member is electrically conductively disposed therebetween.

17 Claims, 5 Drawing Sheets

U.S. PATENT DOCUMENTS

| | | | |
|---|---|---|---|
| 3,122,629 A * | 2/1964 | Manz | 219/74 |
| 3,159,419 A | 12/1964 | Kerby | 296/28 |
| 3,630,056 A | 12/1971 | Cuq | 72/28 |
| 3,971,588 A | 7/1976 | Bauer | 296/28 |
| 4,051,704 A * | 10/1977 | Kimura | 72/58 |
| 4,142,085 A * | 2/1979 | Knipstrom et al. | 219/61 |
| 4,355,844 A | 10/1982 | Muzzarelli | 296/205 |
| 4,471,519 A | 9/1984 | Capello et al. | 29/460 |
| 4,618,163 A | 10/1986 | Hasler et al. | 280/785 |
| 4,648,208 A | 3/1987 | Baldamus et al. | 49/502 |
| 4,660,345 A | 4/1987 | Browning | 4052/648 |
| 4,726,166 A | 2/1988 | DeRees | 52/694 |
| 4,735,355 A | 4/1988 | Browning | 228/189 |
| 4,759,111 A | 7/1988 | Cudini | 29/523 |
| 4,986,597 A | 1/1991 | Clausen | 296/205 |
| 5,031,958 A | 7/1991 | Fujita et al. | 296/194 |
| 5,094,313 A | 3/1992 | Mauws | 180/210 |
| 5,106,249 A | 4/1992 | Janotik | 411/43 |
| 5,209,541 A | 5/1993 | Janotik et al. | 296/29 |
| 5,213,386 A * | 5/1993 | Janotik et al. | 296/29 |
| 5,228,259 A | 7/1993 | Haddad et al. | 52/653.2 |
| 5,233,789 A | 8/1993 | Priest et al. | 49/360 |
| 5,233,856 A | 8/1993 | Shimanonovski et al. | 72/62 |
| 5,269,585 A | 12/1993 | Klages et al. | 296/205 |
| 5,271,687 A * | 12/1993 | Holka et al. | 403/233 |
| 5,320,403 A | 6/1994 | Kazyak | 296/203 |
| 5,332,281 A | 7/1994 | Janotik et al. | 296/209 |
| 5,333,775 A * | 8/1994 | Bruggemann et al. | 228/157 |
| 5,338,080 A | 8/1994 | Janotik et al. | 296/29 |
| 5,343,666 A | 9/1994 | Haddad et al. | 52/648.1 |
| 5,411,777 A * | 5/1995 | Steele et al. | 428/34.9 |
| 5,458,393 A * | 10/1995 | Benedyk | 296/203 |
| 5,460,026 A | 10/1995 | Schafer | 72/55 |
| 5,481,892 A | 1/1996 | Roper et al. | 72/61 |
| 5,518,209 A | 5/1996 | Chicoine et al. | 244/158 R |
| 5,549,352 A | 8/1996 | Janotik et al. | 296/209 |
| 5,561,902 A * | 10/1996 | Jacobs et al. | 29/897.2 |
| 5,564,785 A | 10/1996 | Schultz et al. | 297/452.2 |
| 5,577,796 A | 11/1996 | Clausen | 296/202 |
| 5,581,947 A | 12/1996 | Kowall et al. | 49/451 |
| 5,582,052 A | 12/1996 | Rigsby | 72/62 |
| 5,600,983 A | 2/1997 | Rigsby | 72/61 |
| 5,641,176 A | 6/1997 | Alatalo | 280/690 |
| 5,649,735 A | 7/1997 | Tomforde et al. | 296/71 |
| 5,673,929 A | 10/1997 | Alatalo | 280/690 |
| 5,718,048 A * | 2/1998 | Horton et al. | 29/897.2 |
| 5,720,092 A | 2/1998 | Ni et al. | 29/421.1 |
| 5,720,511 A | 2/1998 | Benedyk | 296/203 |
| 5,765,906 A | 6/1998 | Iwatsuki et al. | 296/203 |
| 5,794,398 A | 8/1998 | Kaehler et al. | 52/653.2 |
| 5,800,003 A * | 9/1998 | Clenet | 296/96 |
| 5,845,382 A | 12/1998 | Schultz et al. | 29/421.1 |
| 5,848,853 A | 12/1998 | Clenet | 403/272 |
| 6,068,176 A * | 5/2000 | Petrikas | 228/56.3 |
| 6,092,865 A | 7/2000 | Jaekel et al. | |
| 6,225,598 B1 * | 5/2001 | Nihei et al. | 219/137 PS |

* cited by examiner

WELDING MATERIAL ASSEMBLY AND METHOD

This application is a continuation-in-part of application Ser. No. 09/173,554, filed Oct. 16, 1998, now U.S. Pat. No. 6,092,865, which is hereby incorporated by reference in its entirety. Which claims benefit of Prov. No. 60/062,204 filed Oct. 16, 1997.

FIELD OF THE INVENTION

The present invention is generally related to welding operations and more particularly to a welding material assembly and method for using the same.

BACKGROUND OF THE INVENTION

Welding operations are used in many industrial applications, such as vehicle construction on vehicle assembly lines. To form a welded connection, a desired amount of the welding material must be placed between the surfaces of the weldable members where the joint is to be formed and then heated. This type of joint is difficult to form when the weldable members are tubular in form because it becomes difficult to directly access the surfaces to be welded.

Tubular hydroforming technology is increasingly being used in industry, particularly in the automotive industry. Hydroforming technology offers many advantages for automobile frame construction, but difficulties in welding hydroformed components arise due to the tubular shape of the parts. There is a need in the automotive industry for a technology that allows rapid, low cost joint formation between tubular hydroformed members.

SUMMARY OF THE INVENTION

To meet the needs identified above, the present invention provides a method of welding tubular hydroformed members comprising (a) hydroforming first and second tubular metal blanks to form respective first and second tubular members, each member being constructed of a first metallic material and each having an exterior surface portion; (b) providing at least one welding material member carried in a predetermined arrangement by a flexible carrier sheet, each welding material member being constructed of an electrically conductive metallic welding material capable of bonding in weld-forming relation with the first metallic material and having a greater electrical resistance and a lower melting point than the first metallic material, the flexible carrier sheet being made of an electrically nonconductive material; (c) positioning the first and second tubular hydroformed members and the carrier sheet so that the welding material members are each disposed in current-transmitting relation between the exterior surface portions of the first and second tubular hydroformed members to be joined together; and (d) applying an electrical current and forces across the first and second tubular hydroformed members such that the applied current flows through the surface portions and each welding material member disposed therebetween so as to melt each welding material member and thereby weld the exterior surfaces portions to one another.

Another objective of the present invention is to provide a welding material assembly for positioning a welding material in electrically conductive relation between exterior surface portions of first and second weldable members at a location where the first and second weldable members are to be joined. The welding material assembly includes at least one welding material member mounted on a flexible carrier sheet in a predetermined arrangement, each welding material member being constructed of an electrically conductive metallic welding material capable of melting when heated by application of an electrical current. Each carrier sheet is constructed of a material that is electrically nonconductive and each welding material member is mounted on the sheet such that when the sheet is placed between the exterior surfaces of the first and second weldable members to be welded, each welding material member is electrically conductively disposed therebetween.

The individual carrier sheets can be detachably joined together to form a rollable continuous strip to provide easy handling of the individual welding material assemblies. Accordingly, it is a further objective of the present invention to provide a rolled welding material strip assembly comprising a plurality of welding material assemblies. Each welding material assembly is constructed and arranged to position welding material in electrically conductive relation between exterior surface portions of first and second weldable members at a location where the first and second weldable members are to be joined together. Each assembly includes at least one welding material member mounted on a flexible carrier sheet. Each welding material member is constructed of an electrically conductive metallic welding material capable of melting when heated by application of an electrical current. Each carrier sheet is constructed of a material that is electrically nonconductive and each welding material member is mounted on the sheet such that when the sheet is placed between the exterior surfaces of the first and second weldable members to be welded, each welding material member is electrically conductively disposed therebetween. The welding material assemblies are removably secured to one another and form a rolled continuous strip of the sheets.

The welding material assemblies are particularly well suited to forming joints between individual weldable tubular hydroformed members when constructing a vehicle space frame. A method for forming a space frame for a motor vehicle is contemplated comprising (a) forming each of a pair of upper longitudinal members and a cross member in a hydroforming procedure. Each hydroforming procedure includes: (i) providing a tubular blank constructed of a first metallic material; (ii) placing the blank into a die assembly having die surfaces defining a die cavity; (iii) providing pressurized fluid in an interior of the blank to expand the metallic wall of the blank into conformity with the die surfaces thereby forming a tubular hydroformed weldable member. Each upper longitudinal member includes a pillar forming portion and a longitudinally extending portion. The cross member has a pair of leg portions and a cross section extending therebetween. The leg portions extend from junctures at opposite ends of the cross portion. Each longitudinally extending portion and each juncture has an exterior surface portion. (b) providing a pair of side rail structures; (c) providing a pair of welding material assemblies, each assembly comprising at least one welding material member carried in a predetermined arrangement by a flexible carrier sheet. Each welding material member is constructed of an electrically conductive metallic welding material capable of bonding in welding-forming relation with the first metallic material and has a greater electrical resistance and a lower melting point than the first metallic material. The flexible carrier sheet is made of an electrically nonconductive material; (d) assembling the side rail structures with the members, such that (i) the pillar forming portion of each upper longitudinal member is connected to and forms a pillar structure on a respective one of the side rail structures, (ii) each leg portion of the cross member is connected to a respective one of the side rail structures, and (iii) the surface portion of each upper longitudinal member and the surface portion of the associated juncture of the cross member are in adjacent relation to one another and an associated one of the welding material assemblies is positioned therebetween so that each welding material member is disposed in current transmitting relation between the associated exterior surface portions to be welded together; and (e) applying an electrical current and forces across the tubular hydroformed weldable members such that the applied current flows through the associated pair of exterior surface portions and through each welding material member disposed therebetween so as to melt each welding material member and thereby weld the exterior surface portions to one other.

Other objects, features, and advantages of the present invention will become apparent from the following detailed description, the accompanying drawings, and the appended claims.

DETAILED DESCRIPTION OF THE INVENTION

Figure 1:
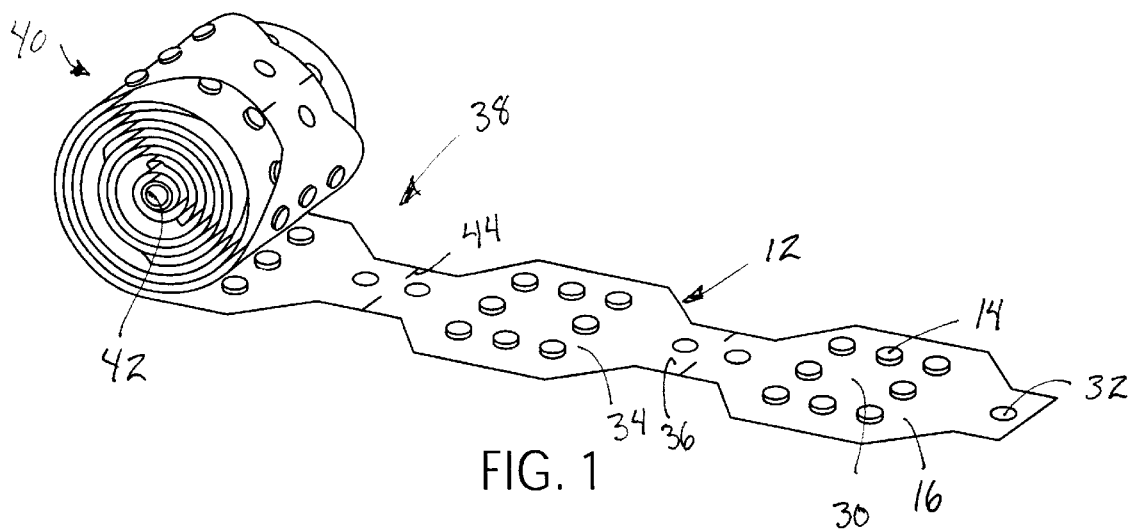
FIG. 1 is a perspective view of a welding material strip assembly constructed according to the principles of the present invention.

FIG. 1 shows a welding material strip assembly, generally designated 10, that is made up of a plurality of welding material assemblies 12 removably joined together to form a rollable continuous strip. Each welding material assembly 12 includes at least one welding material member 14 mounted on a flexible carrier sheet 16 in a predetermined arrangement. As will become apparent, a carrier sheet 16 can be removed from the strip assembly 10 and placed between two surfaces where a welded connection is to be formed to thereby position the welding material members 14 carried by the carrier sheet 16 between the surfaces.

More particularly, each welding material assembly 12 is constructed and arranged to position welding material in electrically conductive relation between the exterior surface portions of first and second weldable members at a location where the first and second weldable members are to be joined. Each welding material member 14 is constructed of an electrically conductive metallic welding material capable of melting when heated by application of an electrical current. Each flexible carrier sheet 16 is constructed of a material that is electrically nonconductive, and each welding material member 14 is mounted on the carrier sheet 16 such that when the sheet is placed between exterior surfaces of first and second weldable members to be welded, each welding material member 14 is electrically conductively disposed therebetween.

Figure 2:
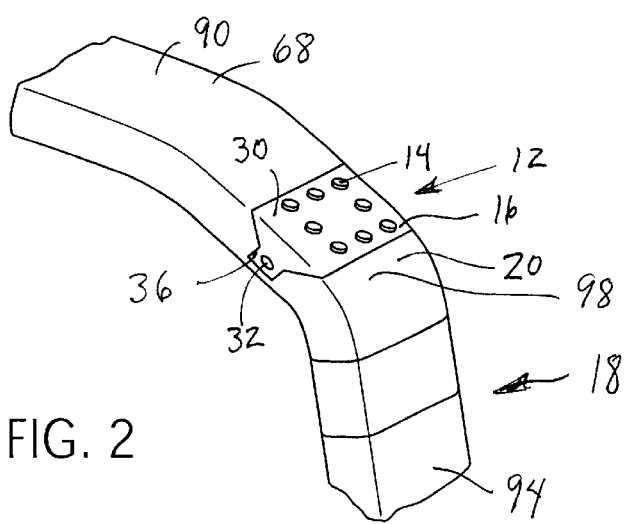
FIG. 2 is a perspective view of a welding material assembly constructed according to the principles of the present invention mounted on a first weldable member.
Figure 3:
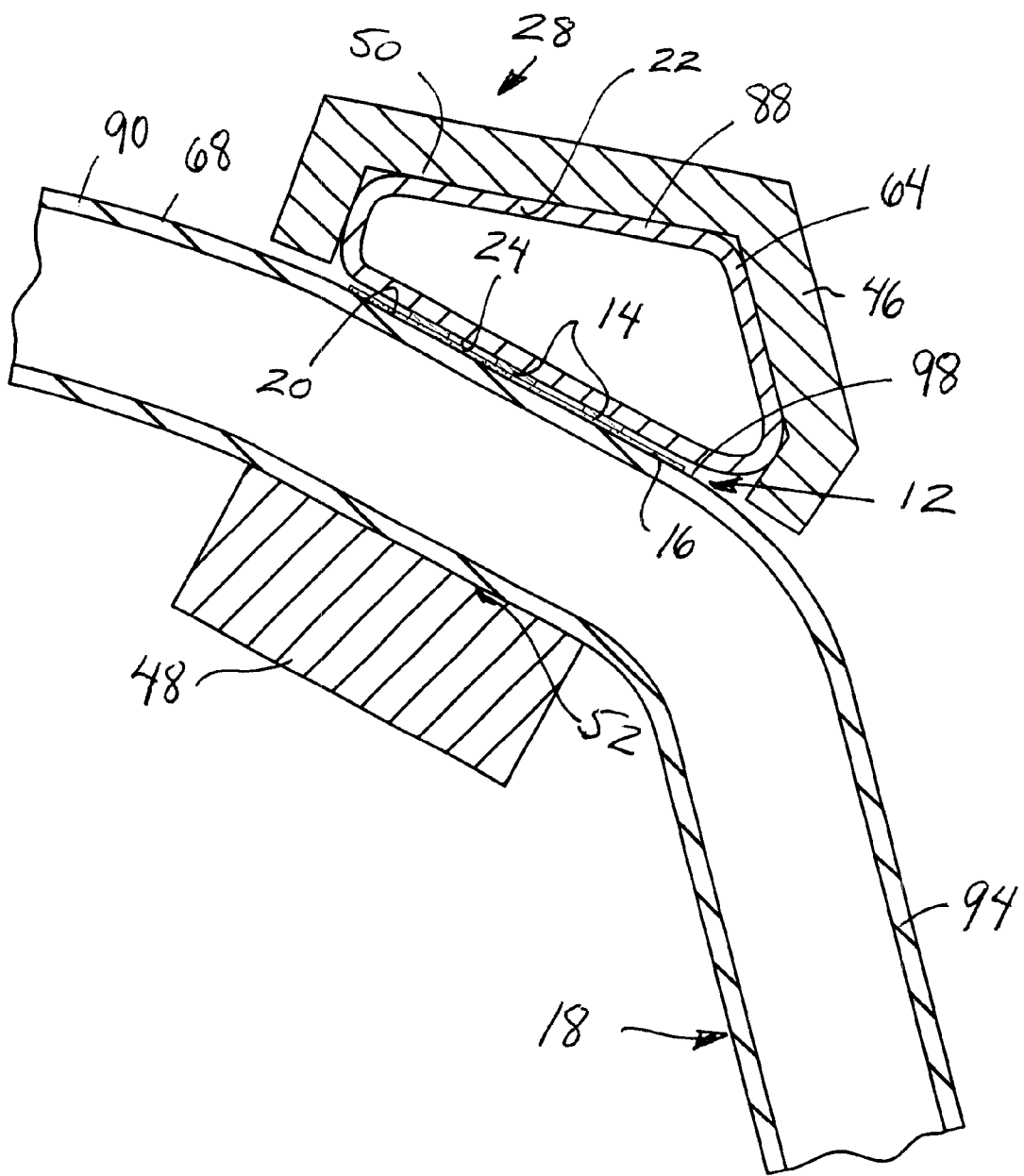
FIG. 3 is a sectional view showing the welding material assembly disposed between the first weldable member and a second weldable member prior to joint formation and showing a schematically represented resistance welding apparatus engaged with the weldable members.
Figure 4:
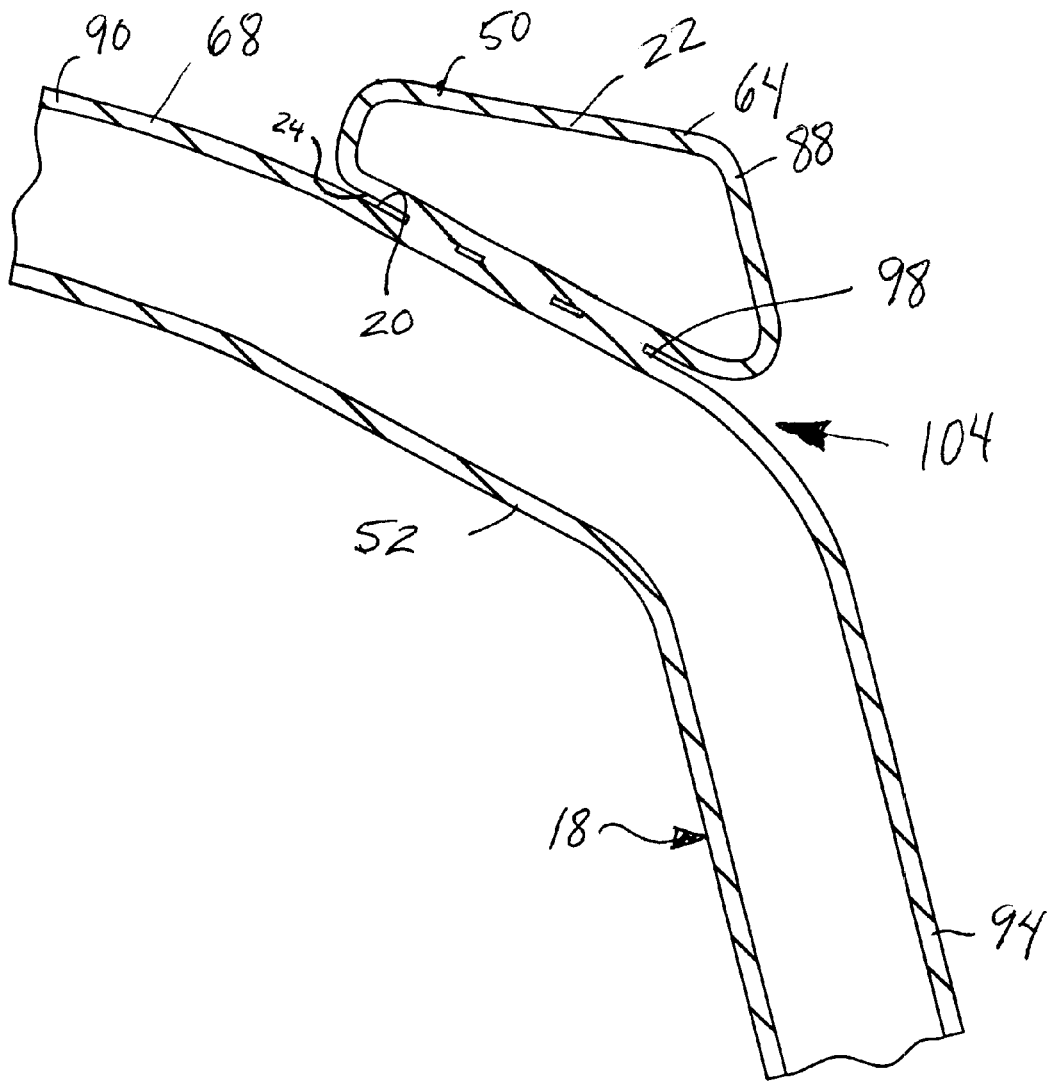
FIG. 4 is a view similar to FIG. 3 except showing the first and second weldable members after joint formation.
Figure 5:
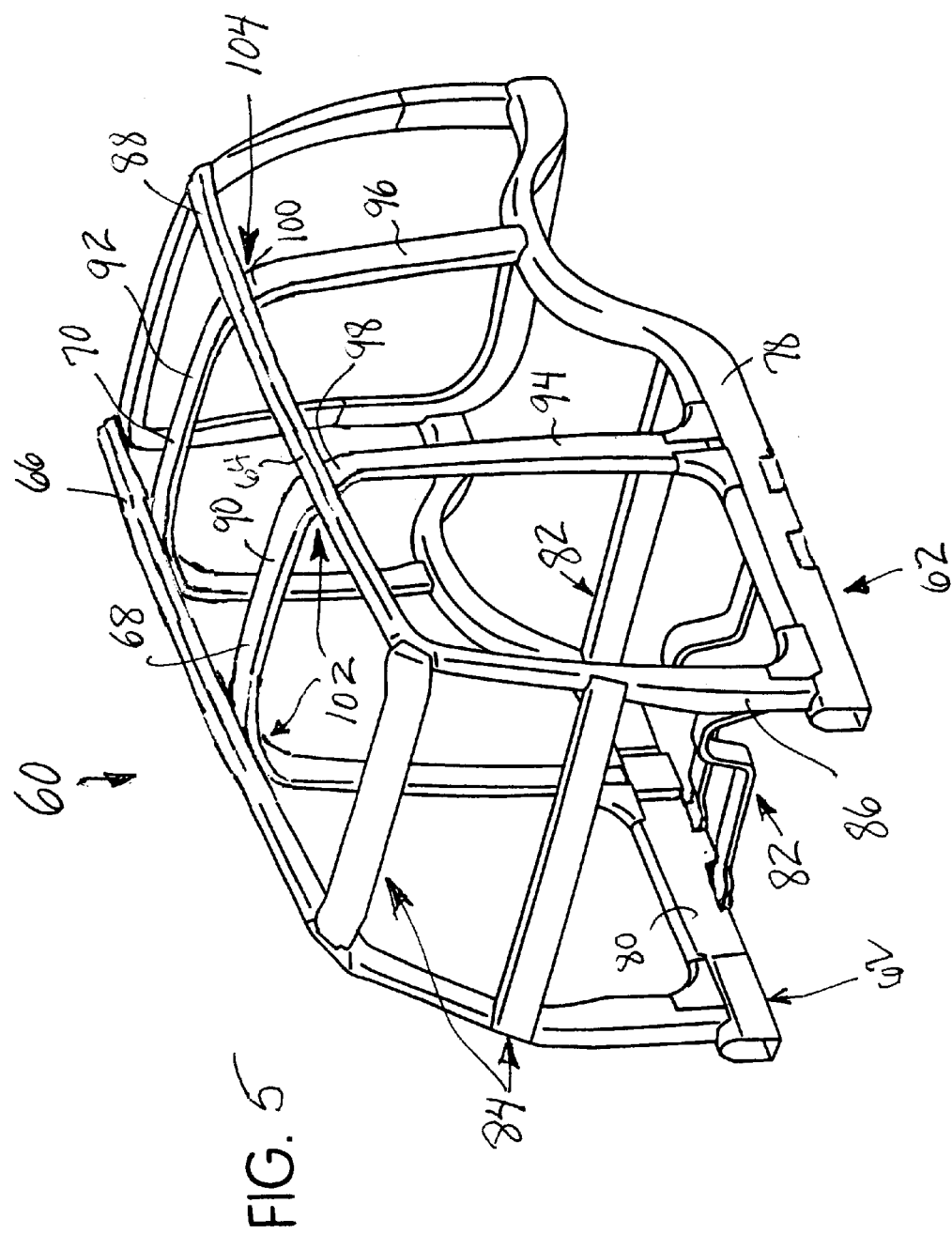
FIG. 5 shows a perspective view of a space frame for a motor vehicle that includes joints formed according to a method of the present invention.

The details of the construction and use of the welding material assemblies 12 can be understood from FIGS. 2–4. FIG. 2 shows an individual welding material assembly 12 mounted on an exterior surface portion 20 of a first weldable member 18 in the form of a first tubular hydroformed member. FIG. 3 shows a second weldable member 22 in the form of a second tubular hydroformed member disposed in overlying relation to the first weldable member 18 with the welding material assembly 12 disposed therebetween. The first and second members 18, 22 in FIGS. 2–4 are intended to be a generic representation of two members that can be welded together using a welding material assembly 12 in a manner described below. As will become apparent, the exemplary first and second members 18, 22 used to illustrate the welding process are portions of individual hydroformed members that are joined together to form part of a space frame as shown in FIG. 5. A modified resistance weld apparatus generally designated 28 is shown schematically in FIG. 3 engaged with the weldable members 18, 22. FIG. 4 shows the first and second weldable members 18, 22 after joint formation.

The welding process illustrated in FIGS. 3–4 is a derivative of resistance welding and utilizes transient liquid phase bonding and resistance heating. The welding material assembly 14 can be used, for example, to join together two tubular hydroformed members 18, 22. The welding material assembly 14 and a preferred method of using the same provide a way for individual hollow hydroformed sections of the pair of hydroformed members 18, 22 to be welded together in adjoining relation without direct access to the welding surfaces 20, 24, respectively, of the weldable members 18, 22 while the welded connection (or joint) is being formed.

The welded connection is formed by positioning at least one welding material member 14 constructed of a metallic welding material that is different from the metallic material used to construct each of the weldable hydroformed members 18, 22 between the exterior surfaces 20, 24 to be joined. Preferably a plurality of welding material members 14 are mounted on each carrier sheet 16 (although only one is required) for positioning between the surfaces 20, 24 to be joined (i.e., welded together) and preferably these welding material members are arranged on each carrier sheet 16 to position the welding material members 14 to maximize joint strength and optimize joint formation. In the exemplary embodiment of the welding material assembly 12 shown in FIGS. 1–3, each welding material member 14 is a thin, small diameter disk-shaped member, but it can be understood that a wide range of welding material member shapes and sizes are contemplated.

The size and shape selected for each of the welding material members 14 will depend on many factors including the materials used to construct the weldable members, the material used to construct the welding material members and the size and shape of the joint area between the two weldable members (i.e., the size and shape of the overlapping surface areas of the two weldable members). Each welding material member is shown being a circular disc, but can have any desired shape. As mentioned, it is contemplated to provide welding material assemblies in which a single welding material member is mounted on each carrier sheet. A range of broad, thin shapes (e.g., a large X-shape) of the welding material member is contemplated for instances in which only one welding material member is mounted on each sheet 16. Preferably a plurality of welding material members 14, each being in the form of a small thin disk is mounted on each carrier sheet, however, because this thin, small diameter disk shape most readily permits discreet localized areas of electric current flow between the weldable members 18, 22 which facilitates melting of the members 14.

A preferred welding material for the welding material members 14 is stainless steel in the instance in which the hydroformed weldable members 18, 22 are constructed of a mild steel, which is also preferred. It is contemplated, however, to use a wide range of metallic welding materials to construct the welding material assemblies and to use the assemblies to form welded connections between weldable members that are constructed of other materials, such as aluminum.

The welding material used to construct each welding material member 14 should be more resistive (i.e., have a greater resistance to the flow of electrical current) and have a lower melting point than the metallic material used to construct each weldable member 18, 22.

The carrier sheets 16 allow the welding material members 14 to be easily handled and to be held in a predetermined configuration between the surfaces 20, 24 to be welded together before the weld is formed. Preferably a central portion 30 of each carrier sheet 16 has a size and shape that corresponds to the area of the overlap between the overlying exterior adjacent surfaces 20, 24 to be bonded and preferably the welding material members 14 are of a predetermined size and shape and are arranged in a predetermined pattern to assure optimal bonding between the weldable members 18, 22.

Preferably each carrier sheet 16 is constructed of an electrically nonconductive paper or plastic material that disintegrates during the welding process to an extent sufficient to permit the welding material members 14 to expand in diameter when melted during welding. The carrier sheet 16 should be thinner than the welding material members 14 so that the carrier sheet 16 does not interfere with the forces applied during welding as will be described. The welding material members 14 are attached to the carrier sheet 16 preferably by forcing the welding material members 14 into pre-formed holes in the carrier sheet 16, so that the welding material members 14 become wedged in the preformed holes.

Preferably the carrier sheet 16 further includes a plurality of securing weldable material members 32 constructed and arranged to affix the carrier sheet 16 to a surface of one of the weldable members such as surface 20 of a metallic member 22 at a location thereon where a welded connection is to be formed. The securing weldable material members 32 hold the carrier sheet 16 in place while the second weldable member is place in overlying relation thereto. In the exemplary embodiment of the welding material assembly 12 shown, for example, in FIG. 2, the carrier sheet 16 has a pair of tapered portions 34 on each side of the central portion 30 that terminate in narrow end portions 36. A securing weldable material member 32 is provided on each end portion 36 to enable the assembly 12 to be welded to the sides of one of the hydroformed members prior to resistance welding. Alternatively, the members 32 can be adhesive members such as a two-faced tape or any other appropriate structure that can hold the carrier sheet 16 to one hydroformed member while the other hydroformed member is placed in overlying relation.

As mentioned above and as shown in FIG. 1, the individual weld carrier sheets 16 can be removably attached end-to-end to form the welding material strip assembly 10. Because the carrier sheets 16 are thin and flexible, the welding material strip assembly 10 can be easily wound into a roll 40. The exemplary strip assembly 10 is shown in FIG. 1 wound around a spindle 42 for easy storage, shipping and handling. The carrier sheets 16 are preferably manufactured as a continuous strip of material that is perforated at boundaries between adjacent end portions 36 by a series of small aligned slits 44, although a wide range of manufacturing methods and structures for removably securing the sheets together is contemplated.

To form a joint in accordance with the method of the invention, one carrier sheet 16 is removed from the welding material strip assembly 10 to separate one welding material assembly 12 from the continuous strip. The single welding material assembly 12 is placed on the exterior surface portion 20 of the first hydroformed member 22 (FIG. 2) in the location where the joint is to be formed and is held there by the securing weldable material members 32. The second hydroformed member 18 is placed in overlying relation to the sheet 16 (FIG. 3) so that the exterior surface 24 is in contact with the welding material members 14.

The modified resistance weld gun apparatus 28 (or a modified spot welding gun) is used to apply an electrical current and an axial force (i.e., a force perpendicular to the two exterior surfaces 20, 24 in the weldable members 18, 22) across the two hydroformed members 18, 22 and across the welding material members 14 during joint formation. More particularly, the apparatus 28 includes a pair of current conducting members 46, 48 (that supply an electrical current from a current source to form the weld) that are applied to exterior surfaces 50, 52, respectively, of the two hydroformed members 18, 22 to be joined in the area where the weld connection or joint therebetween is to be formed. The weld gun apparatus 28 can be controlled manually or robotically.

The conductive members 46, 48 cause a current to flow through the surfaces 20, 24 to be bonded (i.e., joined) and through the welding material members 14. Because the material of the carrier sheet 16 is not electrically conductive, the carrier sheet 16 prevents shunting during the welding process (that is, while a current is being supplied by the apparatus 28). The welding material is more resistive and has a lower melting point than the base joint metallic material used to construct the hydroformed members 18, 22. The material properties of the contiguous members 14, 18, 22 combine to create preferential heating and subsequent localized melting of the welding material members 14 prior to the melting of the hollow section material of the hydroformed members 18, 22. The welding material members 14 liquefy during the welding process.

The energy required to liquefy the welding material members 14 is generated by the applied electrical current. The welding material members heat up preferentially and cause melting of the welding material members 14 and then localized melting of the adjacent metallic material of the hydroformed members 18, 22. The melted material of the welding material members 14 bonds with the basic metallic material of the hydroformed members 18, 22 under the axial pressure applied by the conductive members 46, 48. After the aforementioned melting occurs, the current flow through the surfaces 20, 24 is switched off The axial force is preferably removed a predetermined amount of time thereafter.

The resulting welded connection is represented in FIG. 4. The carrier sheet 16 has been substantially disintegrated in FIG. 4. In addition, as shown, a very thin gap is left between the hydroformed members 18, 22. The combining of the metallic materials of the metal members 14, 18, 22 is indicated in the cross sectional view of FIG. 4. It can be appreciated that this representation of the welded area is enlarged and exaggerated to more clearly illustrate the welded connection and to indicate the mixing of the metallic materials in the areas where the weld is formed.

Preferably the current is applied through the first and second weldable members 18, 22 and across the welding material members 14 so as to melt the welding material members 14 and thereafter to melt portions of the first and second weldable members 18, 22 in areas thereof that are adjacent to the welding material members and preferably the forces are applied so as to move the first and second exterior surface portions 20, 24 toward one another.

Preferably, each of the exterior surfaces 20, 24 is planar, although they may be of any configuration that is adapted for joint formation. For example, the surfaces can have complimentary convex/concave configurations and the like.

It can be understood that the welding material assemblies 12 and methods for using the same are particularly well suited for forming joints between individual hydroformed members. It is contemplated to use the welding material assemblies 12 and methods of present invention to form joints between the individual hydroformed members used to construct a space frame for a motor vehicle. An example of a method for using a welding material assembly 12 for forming a space frame joint is described below. The example is described with reference to an exemplary embodiment of a space frame for a sports utility vehicle shown in FIG. 5. Other examples of space frame joints that are particularly well suited for use with the present welding material assemblies and with methods utilizing the assemblies are disclosed in commonly assigned U.S. patent application Ser. No. 09/173,554 and entitled HYDROFORMED SPACE FRAME AND METHOD OF MANUFACTURING THE SAME, hereby incorporated by reference in its entirety into the present application for all material disclosed therein FIG. 5 shows a perspective view of a motor vehicle space frame 60. The space frame 60 includes a pair of longitudinally extending, laterally spaced side rail structures 62, a pair of hydroformed upper longitudinal members 64, 66, a pair of hydroformed U-shaped cross members 68, 70 and a rearward ring assembly 72. Preferably the side rail structures 62 are provided by a pair of hydroformed members 78, 80 of mirror image construction. A plurality of laterally extending cross structures generally designated 82 are connected between the side rail structures 62 and a pair of laterally extending upper cross structures 84 are connected between the pair of upper longitudinal members 64, 66.

Each hydroformed upper longitudinal member 64, 66 includes a pillar forming portion 86 and a longitudinally extending portion 88. Each upper longitudinal member 64, 66 is connected to an associated side rail structure 62 and extends upwardly therefrom to form an A pillar of the space frame 60. Each hydroformed cross member 68, 70 includes a cross portion 90, 92, respectively, and a pair of leg portions 94, 96, respectively, extending from junctures 98, 100 at opposite ends of the associated cross portion. Each leg portion of the cross member is connected to a respective side rail structure 62 and extends upwardly therefrom to provide an intermediate pillar thereon (i.e., the B pillars and C pillars). The longitudinally extending portion 88 of each upper longitudinal member 64, 66 is connected to the juncture 98, 100 of the associated cross member 68, 70 to form a joint 102, 104, respectively.

The structure of the side rail structures 62 (and thus of the side rail members 78, 80), the rearward ring assembly 72 and the cross structures 82, 84 and the manner in which these components are assembled to the space frame 60 are described in the above incorporated Ser. No. 09/173,554 and this description will not be repeated in the present application.

Each upper longitudinal member 64, 66 and each cross member 68, 70 is preferably of tubular hydroformed construction and each is formed by hydroforming a metallic wall of a tubular blank so that each hydroformed member is defined by an outwardly deformed metallic wall fixed into a predetermined exterior surface configuration corresponding to that of the hydroforming die cavity. Preferably, the blank is hydroformed so that the tubular wall is irregularly outwardly deformed during the hydroforming process.

A complete description of the hydroforming process is included in Ser. No. 09/173,554 and is incorporated by reference into the present application. Consequently, the hydroforming process will not be considered in the present application in detail, but will be briefly described so that the use of the welding material assembly 12 in space frame construction can be understood.

Hydroforming Method

Figure 6:
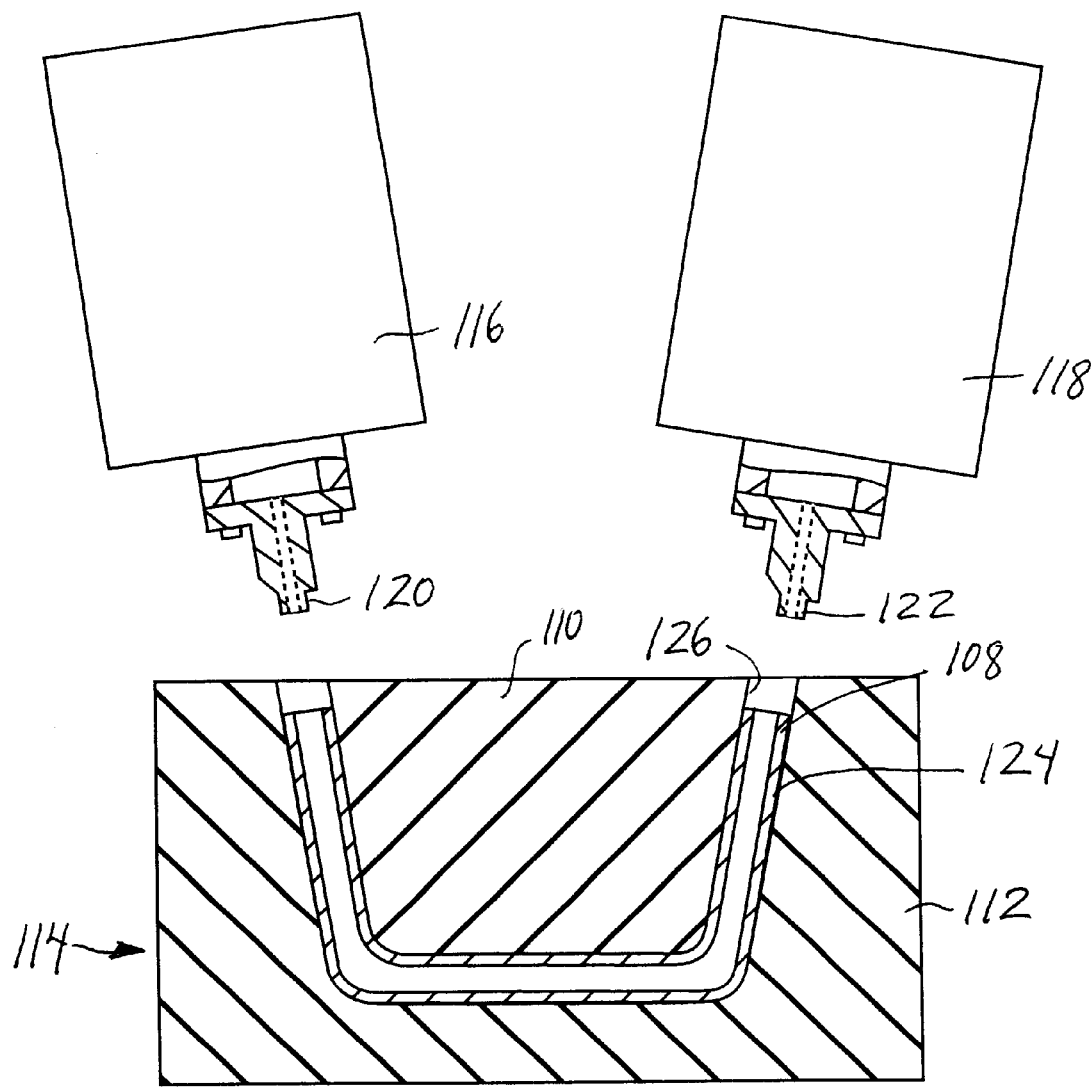
FIG. 6 shows a schematic view of a hydroforming die assembly.

The preferred hydroforming process for forming each hydroformed member of the exemplary space frame 60 can be understood from FIG. 6. Each hydroformed member is formed from a tubular blank 108 constructed of a first metallic material. The blank 108 has a closed transverse cross section, open tubular ends and a predetermined length.

If the geometry of the part is complex or if there are to be any sharp bends (a bend of greater than 30°) in the finished member, the blank 108 may optionally be bent prior to hydroforming. Preferably the blank is bent according the teachings of U.S. Pat. No. 5,953,945, entitled METHOD AND APPARATUS FOR WRIKLE-FREE HYDROFORMING OF ANGLED TUBULAR PARTS, hereby incorporated by reference in its entirety. It should be understood that the methodology of U.S. Pat. No. 5,953,945 would preferably not be used for parts that are bent at an angle of less than 30°.

The blank 108 is then placed between the die halves 110, 112 of a die assembly 114 and the assembly is closed. The die assembly 114 can be a single cavity or multicavity tool, depending on the configuration of the hydroformed member to be produced. The blank 108 is filled with hydroforming fluid and a hydroforming ram assembly 116, 118 engages each end of the blank 108. The hydroforming process uses an internal high pressure of hydroforming fluid to form the tubular blank into the desired shape. A ram member 120, 122 of each assembly 116, 118 seals a respective end of the blank 108. The ram members 120, 122 include hydraulic intensifiers which can intensify the hydroforming fluid, thereby increasing the fluid pressure within the blank 108 to outwardly deform the tubular metallic wall, generally designated 124, of the tubular blank 108 into conformity with the die surfaces 126 of the die cavity to thereby form a hydroformed member having an exterior surface that is fixed into a predetermined configuration based on the shape of the die cavity.

That is, the tubular blank 108 expands into conformity with the surfaces 126 defining the hydroforming die cavity so as to irregularly (or regularly) outwardly expand the metallic wall 124 of the blank 108 into conformity with the surfaces 108 of the die assembly 114 to provide the metallic wall 124 with a shape corresponding to the desired shape for the member. The shape of each die cavity used to form each hydroformed member of the space frame 60 in accordance with the present invention is particularly adapted to the shape of the new and advantageous hydroformed tubular members contemplated herein.

It can be appreciated that the transverse cross section of many of the hydroformed members of the space frame 60 varies along the length of a particular hydroformed member. It can be understood that altering the cross-sectional configuration of any of the tubular hydroformed members shown and/or described herein can be accomplished without departing from the principles of the present invention so that the use of the welding material assemblies and the welding methods of the present invention is not limited to hydroformed members having any particular cross-sectional configuration. The cross sections of the members can be regular (i.e., uniform) or irregular (i.e., nonuniform).

From the description of the exemplary welding material assembly 12, the exemplary space frame 60 and the hydroforming process, it can be understood that the welding material assemblies can be used to form joints between individual tubular hydroformed space frame members during space frame construction. An example of the construction of the space frame joint 102 is shown in and can be understood from FIGS. 2–4. Thus, it can be understood from the general description of the welding methods set forth above that the hydroformed cross member 68 comprises the first weldable member 18 referred to above and that the hydroformed upper longitudinal member 64 is the second weldable member 22. It can be understood that many methods of forming a space frame (and of forming space frame joints) for a motor vehicle are contemplated, a preferred method comprising forming each of a pair of upper longitudinal members 64, 66 and a cross member 68 in a hydroforming procedure. Each hydroforming procedure includes: providing a tubular blank 108 constructed of a first metallic material; placing the blank 108 into a die assembly 114 having die surfaces 126 defining a die cavity; providing pressurized fluid in an interior of the blank 108 to expand the metallic wall of the blank into conformity with the die surfaces 126 thereby forming a hydroformed member 64, 66 or 68 defined by an outwardly deformed metallic wall fixed into a predetermined exterior surface configuration. Each upper longitudinal member 64, 66 is a one-piece, integrally formed hydroformed member and includes a pillar forming portion 86 and a longitudinally extending portion 88. The inverted U-shaped cross member 68 is a one-piece integrally formed hydroformed member having a pair of leg portions 94 extending from junctures 98 at each end of a cross portion 90. Each longitudinally extending portion 88 and each juncture 98 includes an exterior surface portion 24 and 20, respectively, (see, for example, the cross section of FIG. 3). A pair of side rail structures 62 are provided, preferably by a pair of tubular hydroformed members; The side rail structures 62 are assembled with the members 64, 66, 68 such that (1) the pillar forming portion 86 of each upper longitudinal member 64, 66 is connected to and forms a pillar structure (e.g., the A pillar) on a respective side rail structure 62, (2) each leg portion 94 of the cross member 68 is connected to a respective side rail structure 62 and provides an intermediate pillar thereon (e.g., the B pillar), and (3) the surface portion 24 of each upper longitudinal member 64, 66 and the surface portion 20 of the associated juncture 98 of the cross member 68 are in adjacent relation to one another. Each joint 102, one on each end portion of the cross portion 90, is formed at the upper corners of the space frame 60 by positioning the weldable members 64, 66, 68 and a welding material assembly 12 such that the welding material members 14 are disposed in current transmitting relation between the associated exterior surface portions 24, 20 to be welded together. An electrical current and forces are applied across the weldable members 64, 68 such that the applied current flows through the associated pair of surfaces 24, 20 and through each welding material member 14 disposed therebetween so as to melt each welding material member 14 and thereby weld the exterior surface portions 24, 20 to one other.

Preferably the current is applied across associated pairs of weldable members 64, 68 and 66, 68, respectively, and across each welding material member 14 so as to melt each welding material member 14 and thereafter to melt portions of each weldable member 64, 68 and 66, 68 of each associated pair in areas adjacent each welding material member 14 and wherein the forces are applied so as to move the exterior surface portions (surfaces 24, 20 of the pair 64, 68, for example) of the associated weldable members of each pair toward one as the welding material members 14 are melting.

It can be understood that the hydroformed members to be joined (the pair 64, 68, for example) can be hydroformed to have surface portions 24, 20 of a wide range of shapes and sizes. Preferably, each member 64, 68 is hydroformed so that the exterior surface portions 24, 20, respectively, are planar, although the surfaces 24, 20 can be of any complimentary configuration such as concave/convex.

It is contemplated to construct the individual space frame hydroformed members from a wide range of materials. Any weldable and hydoformable metallic material of suitable strength can be used in the construction of the individual hydroformed components for the space frame. In one preferred embodiment, each at least one welding material member 16 of each assembly 12 is constructed of a stainless steel and each tubular hydroformed member 64, 66, 68 is constructed of a milder steel.

It can be appreciated that the space frame 60 is similar to space frames shown and described in the above incorporated Ser. No. 09/173,554 except that in the exemplary space frames shown in Ser. No. 09/173,554, the juncture of each hydroformed cross member is in overlying relation to the longitudinally extending portion of each associated upper longitudinal member, whereas in the present application, this relation is reversed so that the longitudinally extending portion 88 of each upper longitudinal member 64, 68 is in overlying relation to (i.e., above) the associated juncture 98, 100 of the cross member 68, 70. It can be understood, however, that it is within the scope of the present invention to use the welding material assemblies 12 and the methods of the present invention to form a joint between the longitudinally extending portion of each upper longitudinal member and the juncture of the associated cross member in the space frames constructed as shown in Ser. No. 09/173,554 as well.

The weld created using the welding material assembly 12 forms a space frame joint that is comparable in strength to a joint formed by conventional mig welding, but a joint formed utilizing a welding material assembly in a shorter period of time relative to mig welding and by adding a lesser amount of heat to the joint than the amount of heat which is added to a hydroformed joint during mig welding. The relatively high degree of heat transferred to the joint area of the hydroformed members during a mig weld operation is undesirable because this heat generated by mig welding adds to the distortion of, and hence the dimensional inaccuracy of, the space frame. The use of a welding material assembly and of joint forming methods which use the welding material assembly do not generate a comparable amount of heat during joint formation and therefore increase the dimensional accuracy of the space frame over mig welding.

While the welding material strip assembly provides particular advantages in welding tubular hydroformed weldable members, it is contemplated that it may also have application in welding other weldable members that have not been hydroformed, but which nevertheless inhibit access to the weld surfaces.

While the invention has been disclosed and described with reference with a limited number of embodiments, it will be apparent that variations and modifications may be made thereto without departure from the spirit and scope of the invention. Therefore, the following claims are intended to cover all such modifications, variations, and equivalents thereof in accordance with the principles and advantages noted herein.

What is claimed is:

1. A method of welding tubular hydroformed members, comprising:

hydroforming first and second tubular metal blanks to form respective first and second tubular members, each member being constructed of a first metallic material and each having an exterior surface portion;

providing at least one welding material member carried in a predetermined arrangement by a flexible carrier sheet, each said welding material member being constructed of an electrically conductive metallic welding material capable of bonding in weld-forming relation with said first metallic material and having a greater electrical resistance and a lower melting point than said first metallic material, the flexible carrier sheet being made of an electrically nonconductive material;

positioning the first and second tubular hydroformed members and the carrier sheet so that each said welding material member is disposed in current transmitting relation between the exterior surface portions of the first and second tubular hydroformed members to be welded together; and applying an electrical current and forces across said first and second tubular hydroformed members such that the applied current flows through said surfaces and each said welding material member disposed therebetween so as to melt each said welding material member and thereby weld said exterior surface portions to one another.

2. A welding method as defined in claim 1 wherein said current is applied across said first and second tubular hydroformed members and across each said welding material member so as to melt each said welding material member and thereafter to melt portions of said first and second tubular hydroformed members in areas adjacent each said welding material member and wherein said forces are applied so as to move the first and second exterior surface portions toward one another as the welding material members melt.

3. A welding method as defined in claim 2 wherein each of said exterior surfaces is planar.

4. A welding method as defined in claim 1 wherein said flexible carrier carrier sheet comprises paper.

5. A welding method as defined in claim 4 wherein each at least one welding material member is constructed of stainless steel and each tubular hydroformed member is constructed of a milder steel.

6. A welding material assembly for positioning a welding material in electrically conductive relation between exterior surface portions of first and second weldable members at a location where the first and second weldable members are to be joined, the welding material assembly comprising:

at least one welding material member mounted on a flexible carrier sheet in a predetermined arrangement, each said welding material member being constructed of an electrically conductive metallic welding material capable of melting when heated by application of an electrical current, each carrier sheet being constructed of a material that is electrically nonconductive and each said welding material member being mounted on the sheet such that when the sheet is placed between said exterior surfaces of said first and second weldable members to be welded each said welding material member is electrically conductively disposed therebetween.

7. A welding material assembly as defined in claim 6 wherein each said welding material member is constructed of stainless steel and each carrier sheet constructed of a paper material.

8. A welding material assembly as defined in claim 7 wherein the carrier sheet includes a plurality of securing weldable material members constructed and arranged to adhere the carrier sheet to a metal surface of a metallic member at a location thereon where a weld is to be formed.

9. A rolled welding material strip assembly, comprising:

a plurality of welding material assemblies, each assembly being constructed and arranged to position welding material in electrically conductive relation between exterior surface portions of first and second weldable members at a location where the first and second weldable members are to be joined together, each assembly comprising at least one welding material member mounted on a flexible carrier sheet, each said welding material member being constructed of an electrically conductive metallic welding material capable of melting when heated by application of an electrical current, each carrier sheet being constructed of a material that is electrically nonconductive and each said welding material member being mounted on the sheet such that when the sheet is placed between said exterior surfaces of said first and second weldable members to be welded each welding material member is electrically conductively disposed therebetween, said welding material assemblies being removably secured to one another and forming a rolled continuous strip of said carrier sheet.

10. A welding material strip assembly as defined in claim 9 wherein the welding material members of each welding material assembly is constructed of stainless steel and each carrier sheet is constructed of a paper material.

11. A welding material assembly according to claim 10 wherein the carrier sheet includes a plurality of weldable material members con structured and arranged to adhere the carrier sheet to a metal surface of a metal member at a location thereon where a weld is to be formed.

12. A method of forming a space frame for a motor vehicle, said method comprising:

forming each of a pair of upper longitudinal members and a cross member in a hydroforming procedure, each hydroforming procedure including: (a) providing a tubular blank constructed of a first metallic material; (b) placing said blank into a die assembly having die surfaces defining a die cavity; (c) providing pressurized fluid in a n interior of said blank to expand said metallic wall into conformity with said die surfaces thereby forming a tubular hydroformed weldable member;

each upper longitudinal member including a pillar forming portion and a longitudinally extending portion and said cross member having a pair of leg portions and a cross portion extending therebetween, said leg portions extending from junctures at opposite ends of said cross portion, each longitudinally extending portion and each juncture including an exterior surface portion;

providing a pair of side rail structures;

providing a pair of welding material assemblies, each assembly comprising at least one welding material member carried in a predetermined arrangement by a flexible carrier sheet, each welding material member being constructed of an electrically conductive metallic welding material capable of bonding in welding-forming relation with said first metallic material and having a greater electrical resistance and a lower melting point than said first metallic material, the flexible carrier sheet being made of an electrically nonconductive material;

assembling said side rail structures with said members such that (a) the pillar forming portion of each upper longitudinal member is connected to and forms a pillar structure on a respective one of said side rail structures, (b) each leg portion of the cross member is connected to a respective one of said side rail structures, and (c) the surface portion of each upper longitudinal member and the surface portion of the associated juncture are in adjacent relation to one another and an associated one of said welding material assemblies is positioned therebetween so that each said welding material member is disposed in current transmitting relation between said associated exterior surface portions to be welded together;

applying an electrical current and forces across said tubular hydroformed weldable members such that the applied current flows through the associated pair of said exterior surface portions and through each said welding material member disposed therebetween so as to melt each said welding material member and thereby weld said exterior surface portions to one other.

13. A method of forming a space frame as defined in claim 12 wherein said current is applied across associated pairs of said tubular hydroformed weldable members and across each said welding material member so as to melt each said welding material member and thereafter to melt portions of each weldable member of each associated pair in areas adjacent each said welding material member and wherein said forces are applied so as to move the exterior surface portions of the associated tubular hydroformed weldable members of each pair toward one other as the welding material members melt.

14. A method of forming a space frame as defined in claim 13 wherein each of said exterior surface portions is planar.

15. A method of forming a space frame as defined in claim 14 wherein each at least one welding material member of each of said assemblies is constructed of a stainless steel and each tubular hydroformed member is constructed of a milder steel.

16. A method of forming a space frame as defined in claim 15 wherein the longitudinally extending portion of each said upper longitudinal member is in overlying relation with the associated juncture of said cross member.

17. A method of forming a space frame as defined in claim 16 wherein each juncture of said cross member is in overlying relation with the longitudinally extending portion of the upper longitudinal member associated therewith.

* * * * *